Figure 3:
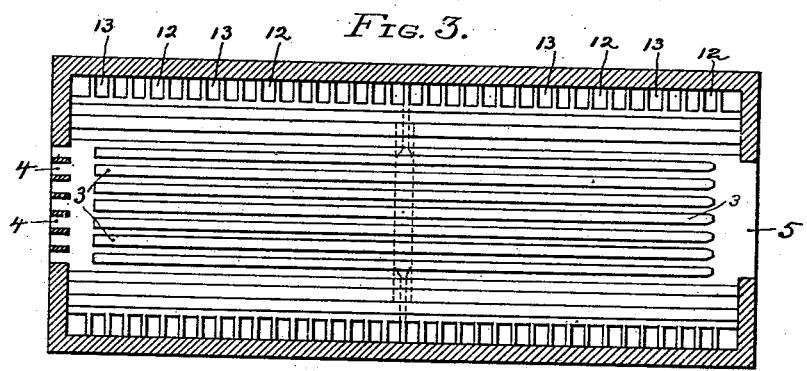

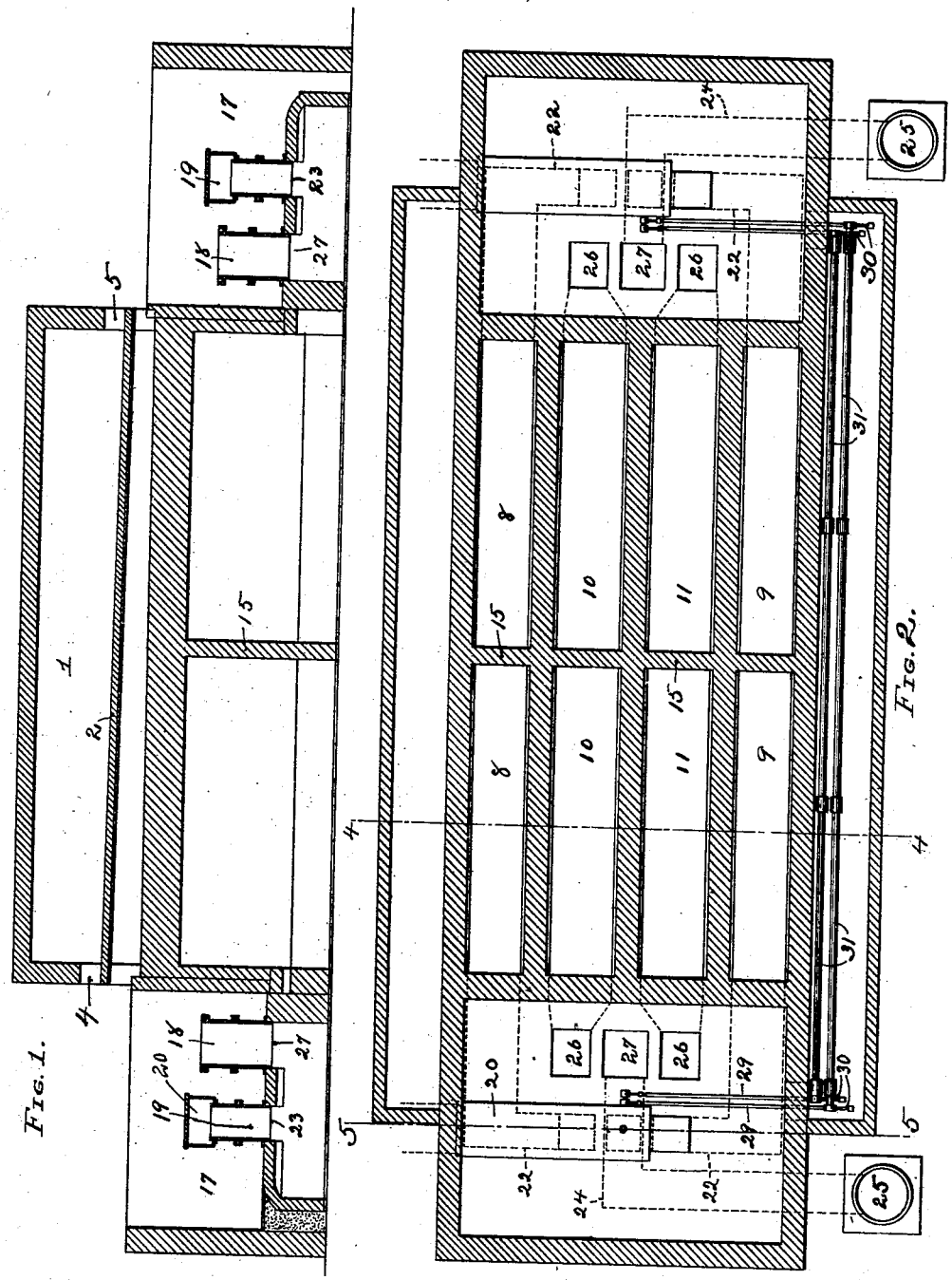

UNITED STATES PATENT OFFICE.

PETER PATTERSON, OF McKEESPORT, PENNSYLVANIA, ASSIGNOR TO NATIONAL TUBE COMPANY, OF NEW YORK, N. Y., A CORPORATION OF NEW JERSEY.

TUBE-WELDING FURNACE.

SPECIFICATION forming part of Letters Patent No. 715,855, dated December 16, 1902.

Application filed March 22, 1901. Renewed March 3, 1902. Serial No. 96,421. (No model.)

*To all whom it may concern:*

Be it known that I, PETER PATTERSON, a resident of McKeesport, in the county of Allegheny and State of Pennsylvania, have invented a new and useful Improvement in Tube-Welding Furnaces; and I do hereby declare the following to be a full, clear, and exact description thereof.

My invention relates to furnaces for heating plates and other blanks; and its object is to provide a furnace suitable for quickly and uniformly heating plates and other blanks of considerable length.

My invention is especially designed for heating plates and skelps to be formed into tubes by welding; and its special object is to provide a furnace for properly heating such plates or skelps of sufficient length for forming more than a single standard length of tubing at one operation, and I will describe my invention particularly as applied to such use; but it will be understood that it is not limited thereto, but may be applied to the heating of any plates or other blanks of considerable length.

As tube-welding operations have heretofore been carried on the most approved practice has been to charge flat plates or strips of metal of a length sufficient to form a single welded tube of standard length through openings in the rear end of the furnace into the furnace-chamber, permitting the strips to rest in the position in which they were charged, and when they were at the proper heat to grasp the end of each strip with tongs or like pipe-drawing tool and connect the same to drawing apparatus, and thereby draw the strip when its edges were at a high welding heat through a welding-bell. This method is described in Letters Patent No. 581,251, granted to me April 20, 1897. The welded tube was then passed through what was termed "sizing-rolls" to bring it to substantially the same diameter throughout its length and then through finishing-rolls, by which the blank was rotated as it was fed forward to smooth its surface and to bring it to true cylindrical form. The strips or plates employed were somewhat shorter than the finished tube, being generally sixteen to eighteen feet in length and forming finished tubes from eighteen to twenty feet in length, and after the tubes were finished the end portions thereof were cut off, the metal at each end of the standard tube being thus wasted and forming scrap.

The several manipulations above described were necessary in the formation of each length of standard tube produced, and as time is lost in each operation and part of the heat of the furnace wasted after the withdrawal of the heated strip or plate and before the charging of a fresh strip or plate it became evident that any means by which the number of manipulations of the tube could be reduced would effect a corresponding saving in the cost of tubing. Accordingly in my applications for patent, filed October 5, 1900, Serial Nos. 32,132 and 32,133, I have described and claimed a method of and apparatus for forming such butt-weld tubing by introducing into the furnace-chamber a blank of sufficient length to form two or more tubes of standard length, raising the edges of said blank to a welding heat, drawing it through a welding-bell, and thereby welding it into tubing, and while the tube is still at a rolling heat dividing it into lengths and then finishing each length.

In carrying out the above-described process of forming butt-weld tubing, whether such tubing be formed in a single standard length or in double standard length, the furnace is maintained at an extremely high welding heat and is preferably maintained at an even heat throughout, though the heat in different parts of the furnace may be varied, if desired. The length of time required for heating the strip or plate in the furnace depends upon the thickness of the strip or plate and may range from, say, three-fourths of a minute for thin plates to a minute and a half or more for the thicker plates. When the strip or plate is at the proper temperature for welding—that is, when the operator sees that the edges are at a welding heat and that the "liquor" begins to flow over the body of the forward end of the strip or plate—he grasps such forward end with his tongs, which he introduces through an opening in the front end of the furnace. The welding-bell is then slipped over the tongs in front of the bell-holder and the tongs connected to the draw-chain by which the heated plate is drawn from the furnace into and through the welding-bell, whereby the welding-hot edges of the plate are forced to curve toward and abut against each other and become welded together within the welding-bell. To obtain the best results, it is necessary that this drawing of the heated strip or plate through the welding-bell be done at just the right time, which is when the edges of said plate have acquired a welding temperature, and it is essential that the body of the plate be so heated as to bend easily, but shall not be so softened as not to stand up in the bell with sufficient strength to compel the edges to abut against each other with sufficient force to effect their proper welding together; otherwise an imperfect weld may be produced. In order to have just the right conditions, it is therefore essential that the plate be subjected to an intensely high temperature, which will quickly raise its edges to a welding heat, but which will not sufficiently soak into the body of the plate to cause the same to become plastic, and that when these conditions are attained the plate shall be quickly drawn from the furnace. By reason of the very short length of time that the plates can be permitted to remain in the furnace difficulties may be experienced in properly heating a furnace of suitable length to form a double standard length of tubing. These furnaces are usually of the regenerative or recuperative type, and, as is well known, in such furnaces the flow of the gas and air through the regenerating-chambers and furnace must be reversed at intervals in order that the air and gas may be properly heated before entering the heating and combustion chamber. With a furnace of a single standard length the reversal of the air and gas takes place comparatively rapidly—that is, it takes but a short time for the regenerating-chamber to be emptied and again filled with gas and air—and on that account the furnace recovers itself rapidly, so that the reversal of the air and gas does not interfere with the maintaining of the proper heat in the chamber of the furnace; but in a furnace of suitable length for forming a double standard length of pipe the regenerating-chambers must be of corresponding length, and it will take a considerable time for them to be emptied and again filled with air and gas, so that the reversal of the air and gas will require an appreciable length of time when compared to the short length of time that the plates ordinarily remain in the furnace and the furnace will be rather slow in recovering itself after being reversed. Furthermore, with such long regenerating-chambers there is a possibility that the air and gas will work their way into the heating-chamber quicker in one place than in another, so that a uniform heat in the chamber cannot be maintained, and this will result in an uneven heating of different portions of the length of the long plates in the furnace, so that not only delay in the heating of those particular plates may occur, but they may be so heated as to produce imperfect welds at different portions along the length of the tube. In the formation of double standard length of tubes according to the process described in my application filed October 5, 1900, above referred to, the plates or strips are usually about thirty-eight feet in length, and the heating-chamber of the furnace must consequently be about forty-one feet in length, and as the regenerating-chambers extend longitudinally throughout the length of the furnace it can readily be seen that it will require a considerable period of time to empty and again fill said chambers in reversing the flow of the air and gas through the furnace.

The object of the present invention is to provide a furnace having a heating-chamber of sufficient length to receive and properly heat long blanks, and especially plates or strips, for more than a single standard length of tubes and which is not open to the defects above pointed out.

To these ends the invention comprises a furnace having a long heating-chamber provided with a hearth upon which the plates or other blanks to be heated rest, said furnace being provided with a double set of longitudinal air and gas regenerating chambers located in a plane beneath the hearth, said chambers being provided with gas and air connections at both ends of the furnace and having reversing means for the air and gas at each end, so that, while the furnace-chamber is a single or continuous one, the air and gas supplying chambers and flues are double, and therefore in the reversing of the air and gas the latter need flow only one-half the length of the furnace, whereby a quicker reversal thereof is obtained and the heat of the furnace is not seriously interfered with during this reversal.

To enable others skilled in the art to use and construct my furnace, I will describe the same more fully in connection with the accompanying drawings, in which—

Figure 4:
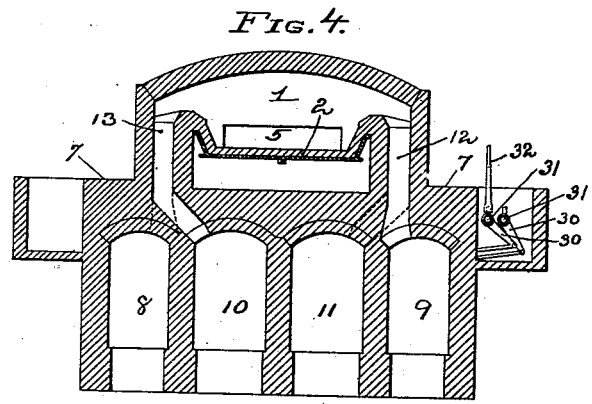
Figure 5:
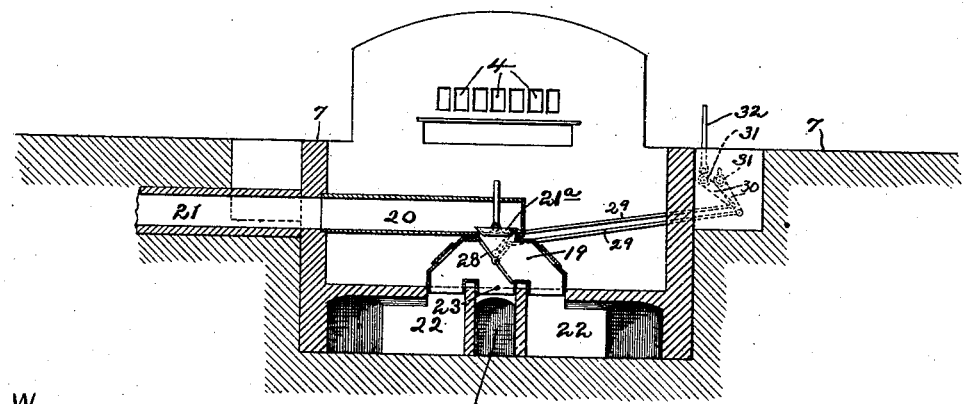

Figure 1 is a longitudinal vertical section through my improved furnace. Fig. 2 is a horizontal section of the same through the air and gas regenerating chambers, showing the double construction of the same. Fig. 3 is a plan view of the furnace with the roof removed. Fig. 4 is a transverse vertical section on the line 4 4, Fig. 2; and Fig. 5 is a similar section on the line 5 5, Fig. 2.
The furnace is constructed of masonry, as is the usual custom, and said furnace comprises the heating-chamber 1, which is provided with the hearth 2 for receiving the plates 3 or other blanks, said strips being fed either manually or by proper charging mechanism through the opening or openings 4 in the rear wall of the furnace and when sufficiently heated are drawn, by means of tongs and a chain, through the opening 5 in the front wall of said furnace. The furnace illustrated is of a length sufficient to receive and contain plates long enough to form two standard lengths of tubes and is preferably from forty to forty-two feet long, and the hearth is of a width sufficient to receive six or more of such strips, as required.

Underneath the hearth and below the level of the floor 7 of the mill are located the air and gas regenerating chambers 8, 9, 10, and 11. In the specific furnace shown the chambers 8 and 9 are the gas-regenerating chambers, while the chambers 10 and 11 are the air-regenerating chambers. These chambers are filled with checker-work, as is common in regenerating-furnaces, which checker-work is heated by the waste products of combustion and then serves in turn to heat the air and gas before they are conducted to the combustion-chamber 1. From the gas-regenerating chambers 8 and 9 suitable flues 12 extend up into the combustion-chamber, and from the air-regenerating chambers 10 and 11 suitable flues 13 extend upward into the combustion-chamber, the flues 12 and 13 being arranged along both sides of the furnace and alternately with each other, as is the common practice in furnaces of this description. The gas-regenerating chambers 8 and 9 and the air-regenerating chambers 10 and 11 at the opposite ends of the furnace are separated by the central dividing-wall 15, which is located about midway of the length of the furnace. At both ends of the furnace are provided suitable pits 17, in each of which is located a box 18, which is suitably connected to an air-supply conduit (not shown) and a box 19, which is connected by the pipe 20 to the gas-supply conduit 21. Between the box 19 and the pipe 20 is an opening provided with a valve 21ª, whereby the amount of gas flowing through said opening can be regulated, as is common in regenerative furnaces. The box 19 communicates by suitable flues 22 with the gas-regenerating chambers 8 and 9 at that end of the furnace and through a suitable opening 23 with the flue 24, which leads to the chimney or stack 25. The box 18 is connected by suitable openings 26 with the air-regenerating chambers 10 and 11 at that end of the furnace and through an opening 27 with the chimney-flue 24, before mentioned. In both the boxes 18 and 19 suitable valves 28 are provided for reversing the course of the air and gas through the furnace, said valves, as illustrated, being of the ordinary butterfly type and being connected by suitable rods 29 to arms 30 on rock-shafts 31, suitably mounted at the sides of the furnace, which rock-shafts extend the length of the furnace and are provided at each end with operating-levers 32, whereby the valves 28 at both ends of the furnace may be operated simultaneously from either end thereof.

In the operation of my furnace for tube-welding purposes the plates 3 are charged through the opening or openings 4 upon the hearth 2, which is covered with sand, broken crockery-ware, or gravel, as is common in this type of furnaces, upon which hearth they remain until properly heated and are then drawn in succession through the opening 5 and through the welding-bell. The air and gas enter, through suitable conduits or mains, into the boxes 18 and 19 at the two ends of the furnace and pass from said boxes, through the openings 22 and 23, respectively, to the air and gas regenerating chambers 8 and 10 on one side of the furnace, in which chambers the air and gas are properly heated by the heated checker-work therein and from which they pass when properly heated upward through the flues 12 and 13 into the heating-chamber 1 at one side of the hearth, in which heating-chamber the heated air and gas are mixed and burned to produce a very high temperature, the flame and heat passing over the hearth 2, across the furnace, and thence downward, through the flues 12 and 13 on the opposite side of the furnace, into the regenerating-chambers 9 and 11 on that side of the furnace and thence, through the openings 23 and 27 in the boxes 19 and 18, respectively, into the flue 24, leading to the chimney 25. As soon as the temperature of the checker-work in the regenerating-chambers 8 and 10 on one side of the furnace has fallen to such an extent as not to properly heat the air and gas the valves 28 are reversed by means of the levers 32, which causes the air and gas to flow through the furnace in the opposite direction—that is, said air and gas then pass, respectively, into the regenerating-chambers 9 and 11, which have become heated by the waste products of combustion, and thence into the heating-chamber 1, from which the waste products of combustion pass down into the regenerating-chambers 8 and 10 on the opposite side of the furnace, thereby again heating the checker-work therein, and thence to the chimneys. The construction of the regenerating-chambers and reversing-valves and the operation thereof is the ordinary one in regenerating-furnaces, the only difference in my invention being that I provide regenerating-chambers and reversing-valves for each end of the furnace, so that the reversal of the air and gas may take place more rapidly and with a more uniform heating of the chamber 1. It will be readily perceived that in a furnace, say, forty-one feet long it will take considerable time for the regenerating-chambers to be emptied and again filled with air and gas in reversing, and on that account the furnace will be rather slow in recovering itself after being reversed. Furthermore, with such long regenerating-chambers there is a possibility that the air and gas will enter the heating-chamber 1 in a non-uniform manner—that is, the air and gas will work their way into the heating-chamber quicker in one place than in another—and on this account a uniform heat in all parts of the chamber 1 could not be maintained, and inasmuch as the plates remain in said heating chamber such a short period of time a non-uniformity in this particular even for a few seconds might detrimentally affect the plates which are in the furnace at the time the air and gas are reversed. By providing what is, in effect, a double arrangement of regenerating-chambers and reversing-valves for the single heating-chamber the air and gases in reversing do not have to flow the entire length of the furnace, and consequently less time will be consumed in emptying and filling said chambers of air and gas and the period of time that it takes the furnace to recover itself will be materially reduced, while the tendency of the air and gas to work their way up into the heating-chamber quicker at one place than at another will also be overcome. By my invention, therefore, loss of time in the furnace recovering itself is obviated and a more uniform heat in the heating-chamber is maintained, so that the uniformity of the output of the furnace is greatly increased.

What I claim as my invention, and desire to secure by Letters Patent, is—

1. A furnace for heating tube-blanks or similar articles, said furnace having a long heating-chamber provided with a hearth for supporting the blanks, a plurality of sets of air and gas chambers, separate air and gas supply connections to said sets of chambers, ports leading from said chambers into the heating-chamber at different points along the length of the latter, and separate reversing means for the air and gas supply for each of said sets of regenerative chambers.

2. A furnace for heating tube-blanks or similar articles, said furnace having a long heating-chamber provided with a hearth for supporting said blanks or other articles, longitudinal air and gas chambers below said hearth, air and gas supply connections to said chambers at both ends of the furnace, and ports leading from said chambers into the heating-chamber at the sides of the hearth.

3. A furnace for heating tube-blanks or similar articles, said furnace having a long heating-chamber provided with a hearth for supporting the blanks or other articles, longitudinal air and gas chambers below said hearth, air and gas supply connections to said chambers at both ends of the furnace, division-walls separating said chambers midway of the length of the furnace, and ports leading from said chambers into the heating-chamber at the sides of the hearth.

4. A furnace for heating tube-blanks and similar articles, said furnace having a long heating-chamber provided with a hearth for supporting the blanks or other articles, longitudinal air and gas regenerating chambers below said hearth, air and gas supply connections to said chambers and means for reversing the air and gas supply at both ends of the furnace, and ports leading from said chambers into the heating-chamber at the sides of the hearth.

5. A furnace for heating tube-blanks or similar articles, said furnace having a long heating-chamber provided with a hearth for supporting the blanks or other articles, two air and two gas regenerating chambers at each end of the furnace, air and gas supply connections and reversing means therefor at each end of the furnace, and ports leading from the air and gas regenerating chambers into the heating-chamber at the sides of the hearth.

6. A furnace for heating tube-blanks or similar articles, said furnace having a long heating-chamber provided with a hearth for supporting the blanks or other articles, two air and two gas regenerating chambers at each end of the furnace, air and gas supply connections to said chambers and reversing means for the same at both ends of the furnace, operating connections between the reversing means at the two ends of the furnace, and ports leading from the air and gas regenerating chambers into the heating-chamber at the sides of the hearth.

7. A furnace for heating tube-blanks or similar articles, said furnace having a long heating-chamber provided with a hearth for supporting the blanks or other articles, longitudinal air and gas regenerating chambers below said hearth and divided midway of the length thereof, air and gas supply flues and chimney-flues at both ends of the furnace, ports leading from the air and gas regenerating chambers to the heating-chamber at the sides of the hearth, and reversing-valves at each end of the furnace for connecting the regenerating-chambers alternately with the air and gas supply flues and with the chimney-flues.

8. A furnace for heating tube-blanks or similar articles, said furnace having a long heating-chamber provided with a hearth for supporting the blanks or other articles, longitudinal air and gas regenerating chambers below said hearth and separated midway of the length thereof, air and gas supply flues and chimney-flues at both ends of the furnace, ports leading from the air and gas regenerating chambers to the heating-chamber at the sides of the hearth, reversing-valves at each end of the furnace for connecting the regenerating-chambers alternately with the air and gas supply flues and with the chimney-flues, and operating connections between the reversing-valves at the two ends of the furnace.

In testimony whereof I, the said PETER PATTERSON, have hereunto set my hand.

PETER PATTERSON.

Witnesses:
ROBERT C. TOTTEN,
ROBT. D. TOTTEN.